(12) United States Patent
Sekine et al.

(10) Patent No.: US 8,419,553 B2
(45) Date of Patent: Apr. 16, 2013

(54) TORQUE FLUCTUATION ABSORBER

(75) Inventors: Tsutomu Sekine, Kariya (JP); Yoshihiro Miyamachi, Nagoya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 43 days.

(21) Appl. No.: 13/227,938

(22) Filed: Sep. 8, 2011

(65) Prior Publication Data

US 2012/0077604 A1 Mar. 29, 2012

(30) Foreign Application Priority Data

Sep. 24, 2010 (JP) ................................. 2010-214349

(51) Int. Cl.
*F16F 15/121* (2006.01)

(52) U.S. Cl.
USPC ........................................................ 464/68.8

(58) Field of Classification Search .................... 464/46, 464/68.1, 68.8, 68.9, 68.91; 192/3.29, 3.3, 192/30 V, 70.17, 204, 213.11, 213.12, 213.21–214.1
See application file for complete search history.

(56) References Cited

U.S. PATENT DOCUMENTS

| 7,192,354 | B2 * | 3/2007 | Uehara |
| 2010/0032259 | A1 | 2/2010 | Saeki et al. |

FOREIGN PATENT DOCUMENTS

JP 2010-38312 A 2/2010

* cited by examiner

*Primary Examiner* — Gregory Binda
*Assistant Examiner* — Josh Skroupa
(74) *Attorney, Agent, or Firm* — Buchanan Ingersoll & Rooney PC

(57) ABSTRACT

A torque fluctuation absorber includes a first damper portion absorbing torque fluctuations caused by a torsion between a first rotary member and a second rotary member, a second damper portion absorbing torque fluctuations caused by a torsion between the second rotary member and a third rotary member, and a stopper portion. The first rotary member includes a first projecting portion projecting radially inwardly and being contactable with the stopper portion by the torsion between the first rotary member and the second rotary member. The third rotary member includes a second projecting portion projecting radially outwardly and being contactable with the stopper portion by the torsion between the third rotary member and the second rotary member. The second projecting portion makes contact with the stopper portion at a radially inner side relative to a portion where the first projecting portion makes contact with the stopper portion.

14 Claims, 5 Drawing Sheets

TORQUE FLUCTUATION ABSORBER

CROSS REFERENCE TO RELATED APPLICATIONS

This application is based on and claims priority under 35 U.S.C. §119 to Japanese Patent Application 2010-214349, filed on Sep. 24, 2010, the entire content of which is incorporated herein by reference.

TECHNICAL FIELD

This disclosure generally relates to a torque fluctuation absorber absorbing torque fluctuations between rotational shafts.

BACKGROUND DISCUSSION

A known torque fluctuation absorber is provided on a drivetrain (i.e., a power transmission passage) between an engine and a motor generator (or a transmission) in a hybrid vehicle, for example, to thereby absorb or restrain torque fluctuations generated between the engine and the motor generator (or the transmission). Such torque fluctuation absorber may include a damper portion absorbing the torque fluctuations by means of an elastic force, a hysteresis portion absorbing or restraining the torque fluctuations by a hysteresis torque generated by friction, for example, and a limiter portion causing a slippage when the torque fluctuations are beyond absorbing capabilities of the damper portion and the hysteresis portion. Such torque fluctuation absorber is disclosed in JP2010-38312A (hereinafter referred to as Reference 1) including plural and individual damper portions so as to increase a torsion angle at each of the damper portions.

The damper portion generally absorbs the torque fluctuations caused by a torsion between an input rotation member and an output rotation member by means of a coil spring. In order to protect the coil spring from the excessive torsion between the input rotation member and the output rotation member, the damper portion includes a stopper portion so as to regulate the torsion between the input rotation member and the output rotation member. In a case where the torque fluctuation absorber includes the plural damper portions, the stopper portion is required at each of the plural damper portions. At this time, when the stopper portion is provided at a position radially displaced relative to a position where the coil spring is provided, the size in the radial direction of the torque fluctuation absorber may increase. In addition, when the stopper portion is provided at a position circumferentially displaced relative to the position where the coil spring is provided, the torsion angle of the damper portion may decrease.

A need thus exists for a torque fluctuation absorber which is not susceptible to the drawback mentioned above.

SUMMARY

According to an aspect of this disclosure, a torque fluctuation absorber includes a first damper portion absorbing torque fluctuations caused by a torsion between a first rotary member and a second rotary member, a second damper portion absorbing torque fluctuations caused by a torsion between the second rotary member and a third rotary member, and a stopper portion inhibiting an excessive torsion at the first damper portion and an excessive torsion at the second damper portion, the stopper portion being fixed to the second rotary member. The first rotary member includes a first projecting portion projecting radially inwardly and being contactable with the stopper portion by the torsion between the first rotary member and the second rotary member. The third rotary member includes a second projecting portion projecting radially outwardly and being contactable with the stopper portion by the torsion between the third rotary member and the second rotary member. The second projecting portion makes contact with the stopper portion at a radially inner side relative to a portion where the first projecting portion makes contact with the stopper portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

First Embodiment

Figure 1:
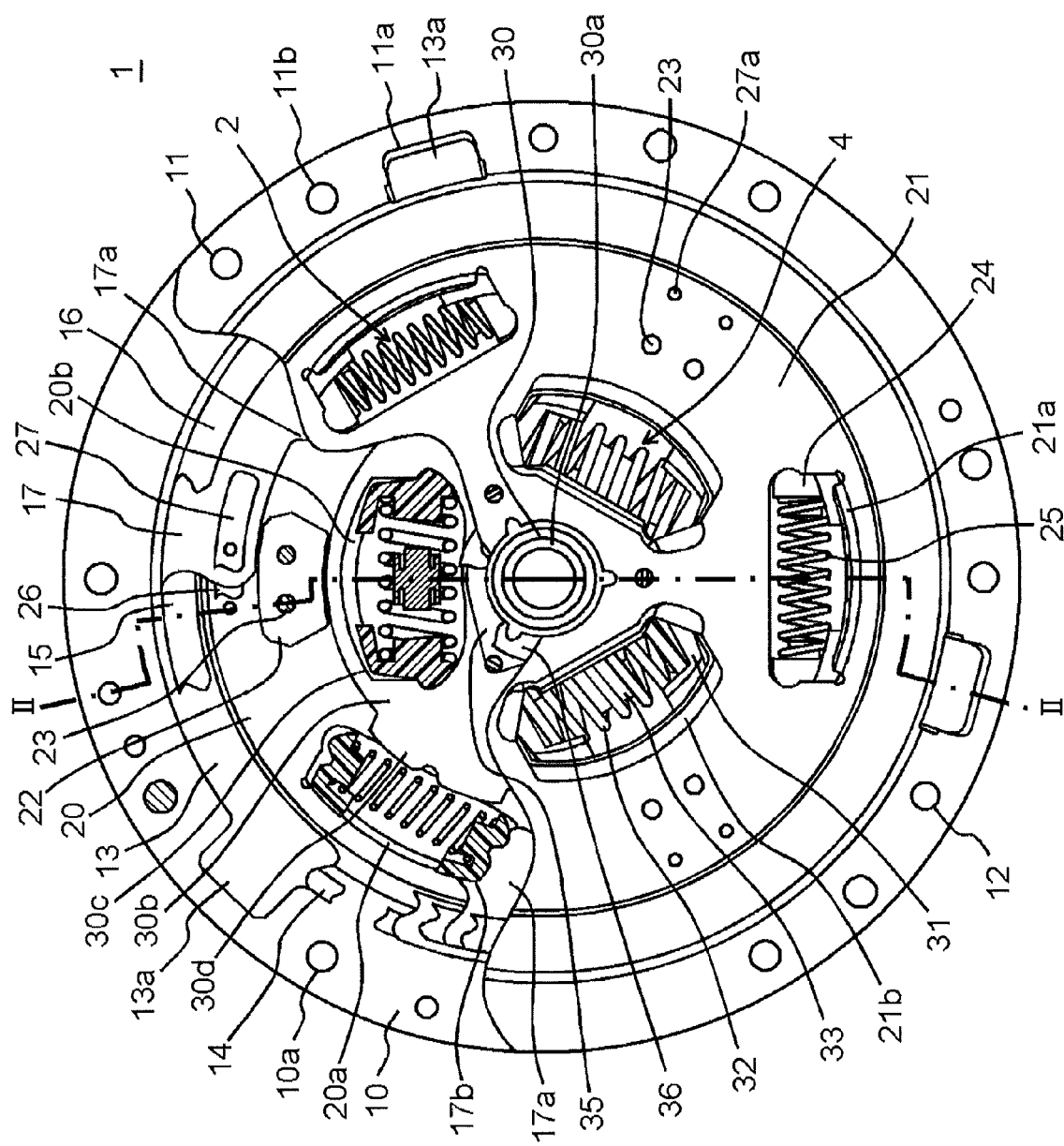
FIG. 1 is a partially cutout plan view schematically illustrating a structure of a torque fluctuation absorber according to a first embodiment disclosed here.
Figure 2:
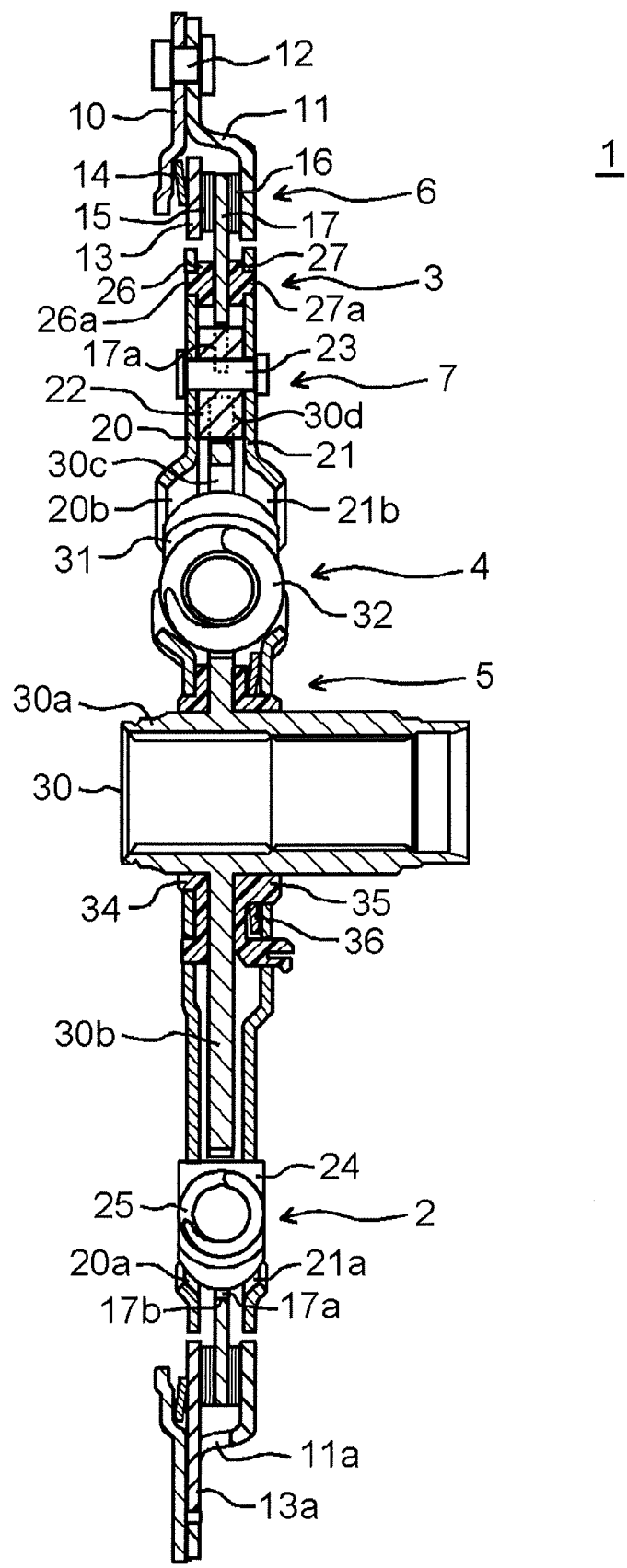
FIG. 2 is a cross-sectional view taken along the line II-II in FIG. 1.
Figure 3:
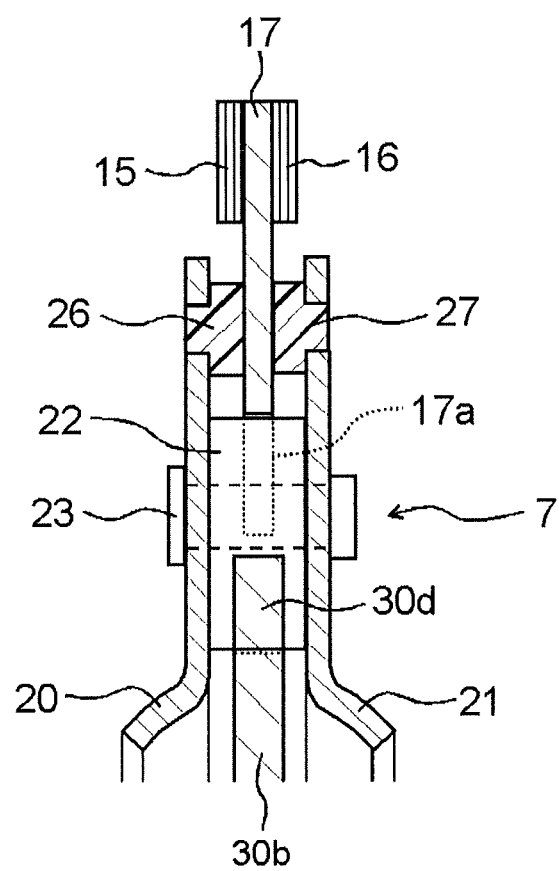
FIG. 3 is an enlarged cross-sectional view schematically illustrating a stopper portion of the torque fluctuation absorber according to the first embodiment.

A torque fluctuation absorber 1 according to a first embodiment is provided, for example, at a power transmission passage between a rotational shaft of an engine and a rotational shaft of a motor generator of a hybrid vehicle, or alternatively a clutch drum of an automatic transmission or a pulley of a continuously variable transmission (CVT). The torque fluctuation absorber 1 absorbs torque fluctuations caused by a torsion (specifically, torsional vibrations generated) between the aforementioned rotational shafts. As illustrated in FIGS. 1 and 2, the torque fluctuation absorber 1 includes first and second damper portions 2 and 4 absorbing the torque fluctuations by means of a spring force, and first and second hysteresis portions 3 and 5 absorbing the torque fluctuations by means of a hysteresis torque such as friction. The torque fluctuation absorber 1 also includes a limiter portion 6 that causes a slippage in a case where the torque fluctuations are beyond absorbing capabilities of the damper portions 2, and 4 and the hysteresis portions 3 and 5. Consequently, the torque fluctuation absorber 1 includes a torsion damping function. In order to protect first and second coil springs 25 and 32 provided at the first and second damper portions 2 and 4 respectively, the torque fluctuation absorber 1 further includes a stopper portion 7 that inhibits the excessive torsion at both of the first and second damper portions 2 and 4.

The first and second damper portions 2 and 4 are arranged in series on the power transmission passage. The first and second damper portions 2 and 4 operate together when the torsion is generated between the rotational shafts. The first damper portion 2 receives a rotational force of the rotational shaft of the engine via the limiter portion 6 and outputs the rotational force to the second damper portion 4. The second damper portion 4 receives the rotational force from the first damper portion 2 via first and second side plates 20 and 21 and outputs the rotational force to the rotational shaft of the motor generator, for example. The first coil springs 25 of the first damper portion 2 are arranged at plural portions (2 or 3 portions; for example, three portions according to the present embodiment as illustrated in FIG. 1) at a radially outer side of the second damper portion 4 so as to be positioned on a single circumference at predetermined intervals relative to an axis of the torque fluctuation absorber 1. The second coil springs 32 of the second damper portion 4 are arranged at plural portions (2 or 3 portions; for example, three portions according to the present embodiment as illustrated in FIG. 1) at a radially inner side of the first damper portion 2 so as to be positioned on a single circumference at predetermined intervals relative to the axis of the torque fluctuation absorber 1. Each of the first coil springs 25 of the first damper portion 2 is away from the adjacent first coil spring 25 at 120 degrees (or 180 degrees) relative to the axis of the torque fluctuation absorber 1. Each of the second coil springs 32 of the second damper portion 4 is away from the adjacent second coil spring 32 at 120 degrees (or 180 degrees) relative to the axis of the torque fluctuation absorber 1. The first coil springs 25 are arranged at the predetermined intervals so as to be circumferentially displaced relative to the second coil springs 32 by a predetermined angle. For example, one of the first coil springs 25 of the first damper portion 2 is displaced by 60 degrees (or 90 degrees) from the adjacent second coil spring 32 of the second damper portion 4.

The first hysteresis portion 3 is arranged in parallel with the first damper portion 2 on the power transmission passage. The first hysteresis portion 3 is substantially arranged on a circumference where the first damper portion 2 is also arranged. Specifically, the first hysteresis portion 3 is separately arranged (divided) at plural portions (2 or 3 portions; for example, three portions according to the present embodiment) at predetermined intervals so as to be circumferentially displaced relative to the first coil springs 25 of the first damper portion 2. The second hysteresis portion 5 is arranged in parallel with the second damper portion 4 on the power transmission passage. The second hysteresis portion 5 is annually arranged on a single circumference at a radially inner side of the second damper portion 4.

The limiter portion 6 is annually arranged at a radially outer side of the first damper portion 2 and the first hysteresis portion 3.

The stopper portion 7 is provided on the substantially same circumference at which the first damper portion 2 is provided. Specifically, the stopper portion 7 is separately arranged (divided) at plural portions (2 or 3 portions; for example, three portions according to the present embodiment) at predetermined intervals so as to be circumferentially displaced relative to the first coil springs 25 of the first damper portion 2. The stopper portion 7 is arranged at a radially inner side relative to the first hysteresis portion 3.

The torque fluctuation absorber 1 includes a support plate 10, a cover plate 11, first rivets 12, a pressure plate 13, a first disc spring 14, first and second friction members 16 and 16, a lining plate 17, the first and second side plates 20 and 21, stopper members 22, second rivets 23, first seat members (specifically, pairs of first seat members) 24, the first coil springs 25, first and second thrust members 26 and 27, a hub member 30, second seat members (specifically, pairs of second seat members) 31, the second coil springs 32, float elastic members 33, third and fourth thrust members 34 and 35, and a second disc spring 36.

The support plate 10 is an annular-shaped plate member and a component member of the limiter portion 6. The support plate 10 overlaps the cover plate 11 at an outer peripheral portion so as to be connected to the cover plate 11 by the plural first rivets 12. The support plate 10 rotates integrally with the cover plate 11. The support plate 10 includes a bolt insertion hole 10a through which a bolt is inserted so as to be attached and connected by the bolt, together with the cover plate 11, relative to a flywheel connected to the rotational shaft of the engine. The support plate 10 is provided to be away from the cover plate 11 at an inner peripheral portion. The support plate 10 is in press-contact with an outer peripheral edge of the first disc spring 14 at a surface facing the pressure plate 13.

The cover plate 11 is an annular-shaped plate member and the component member of the limiter portion 6. The cover plate 11 overlaps the support plate 10 at an outer peripheral portion so as to be connected to the support plate 10 by the plural first rivets 12. The cover plate 11 rotates integrally with the support plate 10. The cover plate 11 includes a bolt insertion hole 11b through which the bolt is inserted so as to be attached and connected by the bolt, together with the support plate 10, relative to the flywheel connected to the rotational shaft of the engine. The cover plate 11 is provided to be away from the support plate 10 at an inner peripheral portion. The cover plate 11 includes cut portions 11a engaging with projecting portions 13a of the pressure plate 13 in an axially movable and non-rotatable manner.

The pressure plate 13 is an annular-shaped plate member and the component member of the limiter portion 6. The pressure plate 13 is provided between the first disc spring 14 and the first friction member 15. The pressure plate 13 includes the plural projecting portions 13a at an outer peripheral edge so as to project radially outwardly. The projecting portions 13a engage with the respective cut portions 11a of the cover plate 11 in the axially movable and non-rotatable manner. The pressure plate 13 is biased by the first disc spring 14 towards the first friction member 15 so as to be slidably in press-contact with the first friction member 15.

The first disc spring 14 is an annular disc-shaped spring disposed between the support plate 10 and the pressure plate 13 and is the component member of the limiter portion 6. The first disc spring 14 biases the pressure plate 13 to the first friction member 15.

The first friction member 15 is an annular-shaped member provided between the pressure plate 13 and the lining plate 17 and is the component member of the limiter portion 6. The first friction member 15 is attached and fixed to the lining plate 17 by means of a rivet, for example. The first friction member 15 is slidably in press-contact with the pressure plate 13.

The second friction member 16 is an annular-shaped member provided between the lining plate 17 and the cover plate 11 and is the component member of the limiter portion 6. The second friction member 16 is attached and fixed to the lining plate 17 by means of a rivet, for example. The second friction member 16 is slidably in press-contact with the cover plate 11.

The lining plate 17 serving as a first rotary member is an annular-shaped plate member and the component member of the first damper portion 2, the first hysteresis portion 3, and the limiter portion 6. The lining plate 17 is provided between the first and second side plates 20 and 21 so as to have clearances therebetween. The lining plate 17 is configured in such a manner that an outer peripheral portion of the lining plate 17 is arranged between the first and second friction members 15 and 16 and fixed thereto by means of a rivet, for example. The lining plate 17 thus functions as the limiter portion 6. The lining plate 17 integrally rotates with the first and second friction members 15 and 16. The lining plate 17 is also configured in such a manner that an inner peripheral portion of the lining plate 17 relative to the limiter portion 6 is arranged between the first and second thrust members 26 and 27 so as to be slidably sandwiched or held therebetween. The lining plate 17 thus functions as the first hysteresis portion 3. Plural portions (for example, three portions according to the present embodiment) of the lining plate 17 are held or sandwiched between the first and second thrust members 26 and 27. The lining plate 17 includes plural pairs of projecting portions 17a each serving as a first projecting portion and extending radially inwardly at a portion circumferentially displaced relative to the first hysteresis portion 3. The lining plate 17 includes window portions 17b each of which is provided between each of the pairs of projecting portions 17a so as to accommodate the pair of first seat members 24 and the first coil spring 25. Each of the window portions 17b makes contact with or separates from the pair of first seat members 24 via circumferential both end surfaces. The lining plate 17 thus functions as the first damper portion 2. The projecting portions 17a also serve as the component member of the stopper portion 7. That is, a circumferentially end surface of each of the projecting portions 17a makes contact with or separates from the stopper member 22 that inhibits the excessive torsion at the first damper portion 2 (i.e., the torsion between the lining plate 17 and the first and second side plates 20 and 21). A radial movement of the lining plate 17 is inhibited and a circumferential movement of the lining plate 17 is guided in a state where an inner peripheral end surface except for the projecting portions 17a of the lining plate 17 is guided by an outer peripheral surface of each of the stopper members 22.

The first side plate 20 serving as a second rotary member is an annular-shaped plate member and the component member of the first damper portion 2, the first hysteresis portion 3, the second damper portion 4, and the second hysteresis portion 5. The first side plate 20 transmits the rotational force from the first damper portion 2 and the first hysteresis portion 3 to the second damper portion 4 and the second hysteresis portion 5. The first side plate 20 is arranged to be away from the second side plate 21 via the stopper members 22. The first side plate 20 is connected, together with the stopper members 22, to the second side plate 21 by means of the second rivets 23. The first side plate 20 and the second side plate 21 are arranged at a first axial side and a second axial side of the lining plate 17 respectively. The first side plate 20 integrally rotates with the stopper members 22 and the second side plate 21. The first side plate 20 includes plural hole portions engaging with plural detent portions 26a (projecting portions) formed at the plural first thrust members 26 (for example, three first thrust members 26 according to the present embodiment) in the axially movable and circumferentially unmovable manner. Specifically, the plural hole portions are arranged at a portion of the first side plate 20 corresponding to the first hysteresis portion 3 that is radially outwardly provided relative to the stopper members 22. The hole portions are provided at plural positions (for example, three positions according to the present embodiment) of the first side plate 20. The first side plate 20 includes window portions 20a at a portion corresponding to the first damper portion 2 that is circumferentially displaced relative to the first hysteresis portion 3 so as to accommodate the first seat members 24 and the first coil springs 25. Circumferentially end surfaces of each of the window portions 20a make contact with or separate from the pair of first seat members 24. The first side plate 20 also includes window portions 20b at a portion corresponding to the second damper portion 4 that is radially inwardly positioned relative to the first damper portion 2 so as to accommodate the second seat members 31 and the second coil springs 32. Circumferentially end surfaces of each of the window portions 20b make contact with or separate from the pair of second seat members 31. The first side plate 20 engages with the third thrust member 34 in the axially movable and non-rotatable manner at a portion corresponding to the second hysteresis portion 5 that is radially inwardly provided relative to the second damper portion 4. The first side plate 20 is rotatably supported by the hub member 30 at a radially inward edge portion via the third thrust member 34.

The second side plate 21 serving as the second rotary member is an annular-shaped plate member and the component member of the first hysteresis portion 3, the second damper portion 4, and the second hysteresis portion 5. The second side plate 21 transmits the rotational force from the first damper portion 2 and the first hysteresis portion 3 to the second damper portion 4 and the second hysteresis portion 5. The second side plate 21 is provided to be away from the first side plate 20 via the stopper members 22. The second side plate 21 is connected, together with the stopper members 22, to the first side plate 20 by means of the second rivets 23. The second side plate 21 integrally rotates with the stopper members 22 and the first side plate 20. The second side plate 21 includes plural hole portions engaging with plural detent portions 27a (projecting portions) formed at the plural second thrust members 27 (for example, three second thrust members 27 according to the present embodiment) in the axially movable and circumferentially unmovable manner. Specifically, the plural hole portions are arranged at a portion of the second side plate 21 corresponding to the first hysteresis portion 3 that is radially outwardly provided relative to the stopper members 22. The hole portions are provided at plural positions (for example, three positions according to the present embodiment) of the second side plate 21. The second side plate 21 includes window portions 21a at a portion corresponding to the first damper portion 2 that is circumferentially displaced relative to the first hysteresis portion 3 so as to accommodate the first seat members 24 and the first coil springs 25. Circumferentially end surfaces of each of the window portions 21a make contact with or separate from the pair of first seat members 24. The second side plate 21 also includes window portions 21b at a portion corresponding to the second damper portion 4 that is radially inwardly positioned relative to the first damper portion 2 so as to accommodate the second seat members 31 and the second coil springs 32. Circumferentially end surfaces of each of the window portions 21b make contact with or separate from the pair of second seat members 31. The second side plate 21 engages with the fourth thrust member 35 in the axially movable and non-rotatable manner and supports an outer peripheral edge of the second disc spring 36 at a portion corresponding to the second hysteresis portion 5 that is radially inwardly provided relative to the second damper portion 4. The second side plate 21 is rotatably supported by the hub member 30 at a radially inward edge portion via the fourth thrust member 35.

Each of the stopper members 22 is formed into a block-shape and the component member of the stopper portion 7. The stopper members 22 are provided at plural portions (for example, three portions according to the present embodiment) between the first and second side plates 20 and 21 at the radially inward side of the first and second thrust members 26 and 27 that are the component members of the first hysteresis portion 3. Each of the stopper members 22 is connected to the first and second side plates 20 and 21 by means of the plural second rivets 23 (for example, the two second rivets 23 as illustrated in FIG. 1 according to the present embodiment). The stopper members 22 inhibit the excessive torsion at the first damper portion 2 while a portion of a circumferentially end surface of each of the stopper members 22 in the vicinity of an outer periphery thereof makes contact with the projecting portion 17a of the lining plate 17 in a case where the torsion is generated between the lining plate 17 and the first and second side plates 20 and 21. The stopper members 22 also inhibit the excessive torsion at the second damper portion 4 while a portion of the circumferentially end surface of each of the stopper members 22 in the vicinity of an inner periphery thereof makes contact with each projection 30d of the hub member 30 in a case where the torsion is generated between the hub member 30 and the first and second side plates 20 and 21. The stopper members 22 inhibit the radial movement of the lining plate 17 and guide the circumferential movement of the lining plate 17 by outer peripheral surfaces. In addition, the stopper members 22 inhibit a radial movement of a flange portion 30b of the hub member 30 and guide a circumferential movement of the flange portion 30b by inner peripheral surfaces.

The second rivets 23 serving as a plurality of rivets connect the first and second side plates 20 and 21 to the stopper members 22. The plural second rivets 23 (for example, the two second rivets 23 as illustrated in FIG. 1) are provided at each of the stopper members 22. Accordingly, the stopper members 22 are connected to the first and second side plates 20 and 21 in a state where the stopper members 22 are restrained from moving relative to the first and second side plates 20 and 21.

The first seat members 24 are the component members of the first damper portion 2. The first seat members 24 are accommodated within the window portions 17b, 20a, and 21a formed at the lining plate 17 and the first and second side plates 20 and 21 respectively. Specifically, the pair of first seat members 24 is arranged, together with the first coil spring 25, within the window portion 17b, the window portion 20a, and the window portion 21a in a state where each of the first seat members 24 is arranged between circumferentially end surfaces of the window portions 17b, 20a, and 21a and an end portion of the first coil spring 25. The first seat members 24 may be made of resin so as to decrease abrasion of the first coil springs 25.

The first coil springs 25 are the component members of the first damper portion 2 and are accommodated in the window portions 17b, 20a and 21a formed at the lining plate 17 and the first and second side plates 20 and 21. Each of the first coil springs 25 is disposed between the pair of first seat members 24 arranged at both sides of the first coil spring 25. The first coil spring 25 contracts when the lining plate 17 and the first and second side plates 20 and 21 rotate relative to each other to thereby absorb a shock caused by a rotational difference between the lining plate 17 and the first and second side plates 20 and 21. A coil length, an outer diameter, a wire diameter, and a weight of each of the first coil springs 25 are specified in relation to the second coil spring 32 and depending on demand characteristics of a vehicle where the torque fluctuation absorber 1 is mounted. According to the present embodiment, in order to restrain a stiffness change of the first coil spring 25 within a regular use range where the rotational force is equal to or smaller than an engine torque, the outer diameter and the weight of the first coil spring 25 are defined to be smaller than those of the second coil spring 32.

The first thrust members 26 are each formed into a block shape and are the component members of the first hysteresis portion 3. The first thrust members 26 are provided between the lining plate 17 and the first side plate 20. The first thrust members 26 are arranged to be circumferentially displaced relative to the first coil springs 25 of the first damper portion 2. The first thrust members 26 are arranged at plural portions so as to face the second thrust members 27. The first thrust members 26 include the plural dent portions 26a (for example, the two dent portions 26a according to the embodiment) engaging with the first side plate 20 in the axially movable and circumferentially unmovable manner. The first thrust members 26 are slidably in contact with the lining plate 17. The first thrust members 26 are pressed against the lining plate 17 by a spring action (spring force) of the first side plate 20. Thus, the lining plate 17 is sandwiched and held between the first and second thrust members 26 and 27, without the usage of a disc spring, at the first hysteresis portion 3.

The second thrust members 27 are each formed into a block shape and are the component members of the first hysteresis portion 3. The second thrust members 27 are provided between the lining plate 17 and the second side plate 21. The second thrust members 27 are arranged to be circumferentially displaced relative to the first coil springs 25 of the first damper portion 2. The second thrust members 27 are provided at plural portions so as to face the first thrust members 26. The second thrust members 27 include the plural detent portions 27a (for example, the two detent portions 27a according to the embodiment) engaging with the second side plate 21 in the axially movable and circumferentially unmovable manner. The second thrust members 27 are slidably in contact with the lining plate 17. The second thrust members 27 are pressed against the lining plate 17 by a spring force of the second side plate 21. Thus, the lining plate 17 is sandwiched and held between the first and second thrust members 26 and 27, without the usage of the disc spring, at the first hysteresis portion 3.

The hub member 30 serving as a third rotary member includes the flange portion 30b extending radially outwardly from a predetermined portion of an outer periphery of a cylinder-shaped hub portion 30a. The hub member 30 is the component member of the second damper portion 4 and the second hysteresis portion 5. The hub member 30 outputs the rotational force of the second damper portion 4 and the second hysteresis portion 5. The hub portion 30a includes an internal spline at an inner peripheral surface so as to be connected to the rotational shaft of the motor generator (which includes an outer spline), for example. The hub portion 30a supports the first side plate 20 to be rotatable via the third thrust member 34. In addition, the hub portion 30a supports the second side plate 21 to be rotatable via the fourth thrust member 35. The flange portion 30b includes the plural projections 30d each serving as a second projecting portion and projecting radially outwardly at an outer peripheral edge. The projections 30d are the component member of the stopper portion 7. Outer peripheral edge surfaces of the projections 30d make contact with or separate from the stopper members 22 restraining the excessive torsion at the second damper portion 4 (i.e., the torsion between the hub member 30 and the first and second side plates 20 and 21). A radial movement of the flange portion 30b is inhibited and a circumferential movement of the flange portion 30b is guided while the outer peripheral edge surface of the flange portion 30b is guided by the inner peripheral surfaces of the stopper members 22. The flange portion 30b includes window portions 30c at a portion corresponding to the second damper portion 4 that is radially inwardly provided relative to the stopper portion 7 so as to accommodate the second seat members 31 and the second coil springs 32. Both circumferential ends of each of the window portions 30c make contact with or separate from the pair of second seat members 31. The flange portion 30b is slidably sandwiched and held between the third and fourth thrust members 34 and 35 in a state where axial surfaces of the flange portion 30b corresponding to the second hysteresis portion 5 radially inwardly provided relative to the second damper portion 4 make contact with the thrust members 34 and 35 respectively.

The second seat members 31 are the component members of the second damper portion 4. The second seat members 31 are accommodated within the window portions 20b, 21b, and 30c formed at the first and second side plates 20 and 21, and the flange portion 30b of the hub member 30 respectively. Specifically, the pair of second seat members 31 is arranged, together with the second coil spring 32, within the window portion 20b, the window portion 21b, and the window portion 30c in a state where each of the second seat members 31 is arranged between circumferentially end surfaces of the window portions 20b, 21b, and 30c and an end portion of the second coil spring 32. In order to decrease the abrasion of the second coil springs 32, the second seat members 31 may be made of resin.

The second coil springs 32 are the component members of the second damper portion 4. The second coil springs 32 are accommodated within the window portions 20b, 21b, and 30c formed at the first and second side plates 20 and 21, and the flange portion 30b of the hub member 30. Each of the second coil springs 32 is disposed between the pair of second seat members 31 arranged at both sides of the second coil spring 32. The second coil spring 32 contracts when the first and second side plates 20 and 21 rotate relative to the hub member 30 to thereby absorb the shock caused by the rotational difference between the first and second side plates 20 and 21 and the hub member 30. An outer diameter of a spiral portion of the second coil spring 32 and a weight thereof may be greater than those of the first coil spring 25 provided at the first damper portion 2. A coil length, an outer diameter, a wire diameter, and a weight of each of the second coil springs 32 are specified in relation to the first coil spring 25 and depending on demand characteristics of the vehicle where the torque fluctuation absorber 1 is mounted. According to the present embodiment, in order to restrain a stiffness change of the second coil spring 32 within a regular use range where the rotational force is equal to or smaller than the engine torque, the outer diameter and the weight of the second coil spring 32 are defined to be greater than those of the first coil spring 25.

The float elastic members 33 are elastic members to absorb the shock caused when the stopper members 22 make contact with the projections 30d of the hub member 30 so that the stopper portion 7 inhibits or blocks the excessive torsion at the second damper portion 4. Each of the float elastic members 33 is arranged in a lifting manner at an inside of the spiral portion of the second coil spring 32. The float elastic member 33 is sandwiched and held between the pair of second seat members 31 in a case where the pair of second seat members 31 provided at the both ends of the second coil spring 32 approaches each other because of the torsion at the second damper portion 4. As a result, the shock caused when the stopper members 22 make contact with the projections 30d of the hub member 30 is absorbed so that the stopper portion 7 inhibits or blocks the excessive torsion at the second damper portion 4.

The third thrust member 34 is an annular-shaped member and the component member of the second hysteresis portion 5. The third thrust member 34 is arranged between the first side plate 20 and the flange portion 30b of the hub member 30. The third thrust member 34 engages with the first side plate 20 in the axially movable and non-rotatable manner. The third thrust member 34 is slidably in press-contact with the flange portion 30b.

The fourth thrust member 35 is an annular-shaped member and the component member of the second hysteresis portion 5. The fourth thrust member 35 is arranged between the second side plate 21 and the flange portion 30b of the hub member 30. The fourth thrust member 35 engages with the second side plate 21 and the second disc spring 36 in the axially movable and non-rotatable manner. The fourth thrust member 35 is biased by the second disc spring 36 from a direction where the second side plate 21 is provided, and is slidably in press-contact with the flange portion 30b.

The second disc spring 36 is a disc-shaped spring and the component member of the second hysteresis portion 5. The second disc spring 36 is arranged between the fourth thrust member 35 and the second side plate 21 so as to bias the fourth thrust member 35 towards the flange portion 30b of the hub member 30.

According to the aforementioned first embodiment, the torsion at the first damper portion 2 and the torsion at the second damper portion 4 are received or blocked by the single stopper portion 7, which leads to a decrease in space and cost of the torque fluctuation absorber 1. In addition, in a case where the torsion at the first damper portion 2 and the torsion at the second damper portion 4 are blocked by the single stopper portion 7, a load direction where the stopper members 22 engage with the projecting portions 17a of the lining plate 17 of the first damper portion 2, and a load direction where the stopper members 22 engage with the projections 30d of the hub member 30 of the second damper portion 4 are opposite from each other. Thus, a stress applied to the stopper members 22 may decrease and a flexibility of design of the stopper portion 7 may increase. In addition, in the stopper portion 7 of the present embodiment, the stopper members 22 are provided on the circumference where the first damper portion 2 is substantially provided and are arranged at plural portions, for example, two or three portions (three portions according to the present embodiment) so as to be circumferentially displaced relative to the first coil springs 25 of the first damper portion 2. As a result, the radial size of the torque fluctuation absorber 1 may be restrained from increasing.

In addition, according to the first embodiment, the lining plate 17 is sandwiched or held between the first and second thrust members 26 and 27 at the first hysteresis portion 3 without the usage of the disc spring, thereby restraining the axial size of the torque fluctuation absorber 1 from increasing. Then, the first hysteresis portion 3 is arranged on the circumference at which the first damper portion 2 is arranged, and is separately provided (divided) at the plural portions circumferentially displaced relative to the first coil springs 25 of the first damper portion 2, thereby restraining the radial size of the torque fluctuation absorber 1 from increasing.

Further, according to the first embodiment, the first coil springs 25 of the first damper portion 2 arranged at the predetermined intervals are circumferentially displaced by the predetermined angles from the second coil springs 32 of the second damper portion 4 arranged at the predetermined intervals. Therefore, the first damper portion 2 is provided radially inwardly to thereby ensure the torsion angle between the first damper portion 2 and the second damper portion 4 and to restrain the increase of the radial size of the torque fluctuation absorber 1.

Furthermore, according to the first embodiment, the projecting portions 13a formed at the outer peripheral edge of the pressure plate 13 engage with the cut portions 11a of the cover plate 11 (at this time, the cut portions 11a may be formed at the support plate 10) to thereby restrain the increase of the axial size of the torque fluctuation absorber 1.

Second Embodiment

Figure 4:
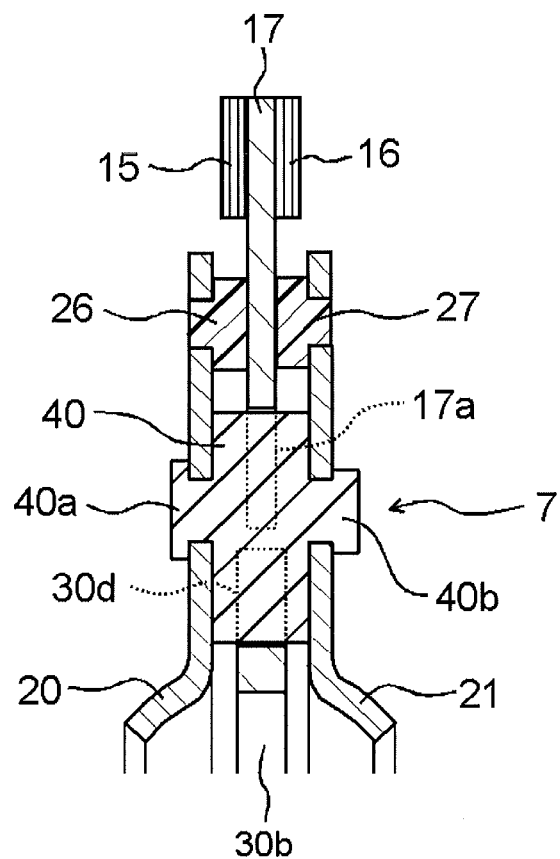
FIG. 4 is an enlarged cross-sectional view of the stopper portion of the torque fluctuation absorber according to a second embodiment disclosed here.

A second embodiment will be explained with reference to FIG. 4. The second embodiment includes an alternate stopper portion (i.e., a stopper member 40) achieved by an integration of the second rivets 23 and the stopper members 22 according to the first embodiment. The other configurations of the second embodiment are the same as the first embodiment.

The stopper member 40 is a block-shaped member and the component member of the stopper portion 7. The plural stopper members 40, for example, three of the stopper members 40, are provided between the first and second side plates 20 and 21 at the radially inner side of the first and second thrust members 26 and 27. Each of the stopper members 40 includes plural first rivet portions 40a, for example, two first rivet portions 40a, projecting to the first side plate 20 so as to rivet and secure the first side plate 20 via a hole portion formed thereat and plural second rivet portions 40b, for example, two second rivet portions 40b, projecting to the second side plate 21 so as to rivet and secure the second side plate 21 via a hole portion formed thereat. The plural first rivet portions 40a and the plural second rivet portions serve as a plurality of rivet portions. As a result, the stopper members 40 connect the first and second side plates 20 and 21 to each other. The stopper members 40 restrain the excessive torsion at the first damper portion 2 when the torsion is generated at the first damper portion 2 (i.e., generated between the first and second side plates 20 and 21, and the lining plate 17) in a state where outer peripheral surfaces of the stopper members 40 make contact with the projecting portions 17a of the lining plate 17. In addition, the stopper members 40 restrain the excessive torsion at the second damper portion 4 when the torsion is generated at the second damper portion 4 (i.e., generated between the first and second side plates 20 and 21, and the flange portion 30b) in a state where inner peripheral surfaces of the stopper members 40 make contact with the projections 30d of the flange portion 30b. The stopper members 40 restrict the radial movement of the lining plate 17 and guide the circumferential movement of the lining plate 17 at the outer peripheral surfaces. The stopper members 40 also restrict the radial movement of the flange portion 30b and guide the circumferential movement of the flange portion 30b at the inner peripheral surfaces.

According to the second embodiment, the same effects as those of the first embodiment are obtained. In addition, the number of components in the stopper portion 7 decreases, which leads to an easy assembly and a reduction of a manufacturing cost of the torque fluctuation absorber 1.

Third Embodiment

Figure 5:
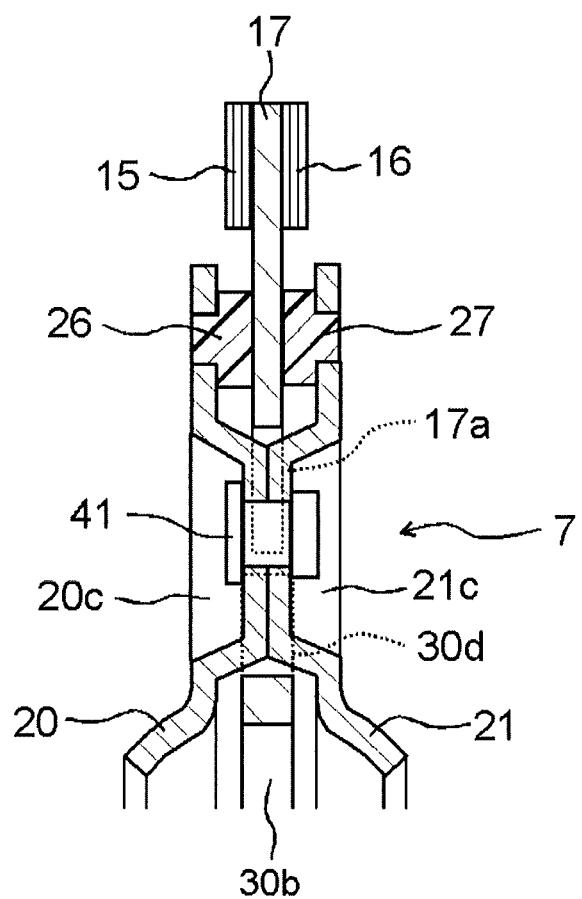
FIG. 5 is an enlarged cross-sectional view of the stopper portion of the torque fluctuation absorber according to a third embodiment disclosed here.

A third embodiment will be explained with reference to FIG. 5.

The third embodiment includes an alternative stopper portion relative to the stopper portion 7 of the first embodiment. Instead of the stopper members 22 of the stopper portion 7, first and second reduced portions 20c and 21c having configurations corresponding to the stopper members 22 of the first embodiment are provided at the first and second side plates 20 and 21. The first and second side plates 20 and 21 overlap at the first and second reduced portions 20o and 21c and make contact with each other at the first and second reduced portions 20c and 21c via a rivet 41. The other configurations of the third embodiment are the same as those of the first embodiment.

The plural first and second reduced portions 20c and 21c (for example, three of the first reduced portions 20c and the second reduced portions 21c) each serving as the stopper portion are formed at the first and second side plates 20 and 21 respectively at the radially inner side of the first and second thrust members 26 and 27 of the first hysteresis portion 3. Each of the first reduced portions 20c and each of the second reduced portions 21c are riveted and fixed to each other by the single rivet 41. As a result, the first and second side plates 20 and 21 are connected at plural portions where the first and second reduced portions 20c and 21c are formed to thereby decrease the number of rivets. The reduced portions 20c and 21c restrain the excessive torsion at the first damper portion 2 when the torsion is generated at the first damper portion 2 (i.e., generated between the first and second side plates 20 and 21, and the lining plate 17) in a state where outer peripheral surfaces of the first and second reduced portions 20c and 21c make contact with the projecting portions 17a of the lining plate 17. In addition, the reduced portions 20c and 21c restrain the excessive torsion at the second damper portion 4 when the torsion is generated at the second damper portion 4 (i.e., generated between the first and second side plates 20 and 21, and the flange portion 30b) in a state where inner peripheral surfaces of the first and second reduced portions 20c and 21c make contact with the projections 30d of the flange portion 30b. The reduced portions 20c and 21c inhibit the radial movement of the lining plate 17 and guide the circumferential movement of the lining plate 17 at the outer peripheral surfaces. The reduced portions 20c and 21c also inhibit the radial movement of the flange portion 30b and guide the circumferential movement of the flange portion 30b at the inner peripheral surfaces. The configurations of the first and second side plates 20 and 21 except for the reduced portions 20c and 21c are the same as those of the side plates 20 and 21 of the first embodiment.

According to the third embodiment, the same effects as those of the first embodiment are obtained. In addition, the number of components in the stopper portion 7 decreases, which leads to an easy assembly and a reduction of a manufacturing cost of the torque fluctuation absorber 1. Further, the number of rivets decreases (as a result, the single rivet 41) to thereby further decrease the manufacturing cost of the torque fluctuation absorber 1.

According to the aforementioned first to third embodiments, the torsion at the first damper portion 2 and the torsion at the second damper portion 4 are received or blocked by the single stopper portion 7, which leads to a decrease in space and cost of the torque fluctuation absorber 1. In addition, in a case where the torsion at the first damper portion 2 and the torsion at the second damper portion 4 are received or blocked by the stopper portion 7, the load direction where the stopper portion 7 engages with the projecting portions 17a of the lining plate 17 at the first damper portion 2 and the load direction where the stopper portion 7 engages with the projections 30d of the hub member 30 at the second damper portion 4 are opposite from each other, which leads to the reduction of the stress applied to the stopper portion 7. As a result, a design flexibility of the stopper portion 7 increases.

According to the aforementioned first embodiment, the stopper portion 7 includes the stopper member 22 having a block shape and the second rivets 23 connecting the stopper member 22 to the side plates 20 and 21.

According to the aforementioned first embodiment, the torsion at the first damper portion 2 and the torsion at the second damper portion 4 are received or blocked by the single stopper portion 7, which leads to a decrease in space and cost of the torque fluctuation absorber 1. In addition, in a case where the torsion at the first damper portion 2 and the torsion at the second damper portion 4 are received or blocked by the stopper portion 7, the load direction where the stopper portion 7 engages with the projecting portions 17a of the lining plate 17 of the first damper portion 2 and the load direction where the stopper portion 7 engages with the projections 30d of the hub member 30 of the second damper portion 4 are opposite from each other, which leads to the reduction of the stress applied to the stopper portion 7. As a result, a design flexibility of the stopper portion 7 increases.

According to the aforementioned second embodiment, the stopper portion 7 includes the stopper member 40 having a block shape, the stopper member 40 including the first and second rivet portions 40a and 40b projecting to the side plates 20 and 21 to rivet the side plates 20 and 21 via the hole portions formed at the side plates 20 and 21.

Accordingly, the number of components in the stopper portion 7 decreases, which leads to an easy assembly and a reduction of a manufacturing cost of the torque fluctuation absorber 1.

According to the aforementioned third embodiment, the stopper portion 7 includes the reduced portions 20c and 21c formed at the side plates 20 and 21.

Accordingly, the number of components in the stopper portion 7 decreases, which leads to an easy assembly and the reduction of the manufacturing cost of the torque fluctuation absorber 1.

According to the aforementioned third embodiment, the side plates 20 and 21 are arranged at the first axial side and the second axial side of the lining plate 17, the reduced portion 20c formed at the side plate 20 at the first axial side of the lining plate 17 and the reduced portion 21c formed at the side plate 21 at the second axial side of the lining plate 17 are connected to each other by the rivet 41.

Accordingly, the number of components in the stopper portion 7 decreases, which leads to an easy assembly and the reduction of the manufacturing cost of the torque fluctuation absorber 1. Further, the number of rivets decreases (as a result, the single rivet 41) to thereby further decrease the manufacturing cost of the torque fluctuation absorber 1.

According to the aforementioned first to third embodiments, the first damper portion 2 includes the first coil springs 25 arranged at the predetermined intervals in the circumferential direction, the first coil springs 25 absorbing the torsion between the lining plate 17 and the side plates 20 and 21. The second damper portion 4 is arranged at the radially inner side relative to the first damper portion 2 and includes the second coil springs 32 arranged at the predetermined intervals in the circumferential direction, the second coil springs 32 absorbing the torsion between the side plates 20 and 21 and the hub member 30. The stopper portion 7 is separately arranged at the plural portions at the predetermined intervals on the circumference where the first damper portion 2 is provided, the stopper portion 7 being circumferentially displaced relative to the first coil springs 25 of the first damper portion 2.

In the stopper portion 7, the stopper members 22 are provided on the circumference where the first damper portion 2 is substantially provided and are arranged at the plural portions, for example, two or three portions so as to be circumferentially displaced relative to the first coil springs 25 of the first damper portion 2. As a result, the radial size of the torque fluctuation absorber 1 may be restrained from increasing.

According to the aforementioned first to third embodiments, the torque fluctuation absorber 1 further includes the first hysteresis portion 3 absorbing the torque fluctuations caused by the torsion between the lining plate 17 and the side plates 20 and 21. The side plates 20 and 21 are arranged at the first axial side and the second axial side of the lining plate 17. The first hysteresis portion 3 is arranged at the plural portions at the predetermined intervals on the circumference where the first damper portion 2 is provided, the first hysteresis portion 3 including the first and second thrust members 26 and 27 arranged to be circumferentially displaced relative to the first coil springs 25 of the first damper portion 2, the first and second thrust members 26 and 27 being provided between the lining plate 17 and the side plates 20 and 21 and engaging with the side plates 20 and 21 in a non-rotatable manner, the first and second thrust members 26 and 27 being biased to the lining plate 17 by a spring action of the side plates 20 and 21. The lining plate 17 is slidably held by the first and second thrust members 26 and 27. The stopper portion 7 is arranged at the radially inner side relative to the first and second thrust members 26 and 27.

The lining plate 17 is sandwiched or held between the first and second thrust members 26 and 27 at the first hysteresis portion 3 without the usage of the disc spring, thereby restraining the axial size of the torque fluctuation absorber 1 from increasing. Then, the first hysteresis portion 3 is arranged on the circumference at which the first damper portion 2 is arranged, and is separately provided (divided) at the plural portions being circumferentially displaced relative to the first coil springs 25 of the first damper portion 2, thereby restraining the radial size of the torque fluctuation absorber 1 from increasing.

According to the aforementioned first to third embodiments, the stopper portion 7 is arranged at the plural portions at the radially inner side relative to the first and second thrust members 26 and 27.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A torque fluctuation absorber comprising:
   a first damper portion absorbing torque fluctuations caused by a torsion between a first rotary member and a second rotary member;
   a second damper portion absorbing torque fluctuations caused by a torsion between the second rotary member and a third rotary member; and
   a stopper portion inhibiting an excessive torsion at the first damper portion and an excessive torsion at the second damper portion, the stopper portion being fixed to the second rotary member,
   the first rotary member including a first projecting portion projecting radially inwardly and being contactable with the stopper portion by the torsion between the first rotary member and the second rotary member,
   the third rotary member including a second projecting portion projecting radially outwardly and being contactable with the stopper portion by the torsion between the third rotary member and the second rotary member, the second projecting portion making contact with the stopper portion at a radially inner side relative to a portion where the first projecting portion makes contact with the stopper portion.

2. The torque fluctuation absorber according to claim 1, wherein the stopper portion includes a stopper member having a block shape and a plurality of rivets connecting the stopper member to the second rotary member.

3. The torque fluctuation absorber according to claim 1, wherein the stopper portion includes a stopper member having a block shape, the stopper member including a plurality of rivet portions projecting to the second rotary member to rivet the second rotary member via a hole portion formed at the second rotary member.

4. The torque fluctuation absorber according to claim 3, wherein
the first damper portion includes a plurality of first coil springs arranged at predetermined intervals in a circumferential direction, the plurality of first coil springs absorbing the torsion between the first rotary member and the second rotary member,
the second damper portion is arranged at a radially inner side relative to the first damper portion and includes a plurality of second coil springs arranged at predetermined intervals in the circumferential direction, the plurality of second coil springs absorbing the torsion between the second rotary member and the third rotary member, and
the stopper portion is separately arranged at plural portions at predetermined intervals on a circumference where the first damper portion is provided, the stopper portion being circumferentially displaced relative to the first coil springs of the first damper portion.

5. The torque fluctuation absorber according to claim 4, further comprising a first hysteresis portion absorbing the torque fluctuations caused by the torsion between the first rotary member and the second rotary member, wherein
the second rotary member is arranged at a first axial side and a second axial side of the first rotary member,
the first hysteresis portion is arranged at plural portions at predetermined intervals on the circumference where the first damper portion is provided, the first hysteresis portion including a plurality of thrust members arranged to be circumferentially displaced relative to the first coil springs of the first damper portion, the plurality of thrust members being provided between the first rotary member and the second rotary member and engaging with the second rotary member in a non-rotatable manner, the plurality of thrust members being biased to the first rotary member by a spring action of the second rotary member,
the first rotary member is slidably held by the plurality of thrust members, and
the stopper portion is arranged at a radially inner side relative to the thrust members.

6. The torque fluctuation absorber according to claim 5, wherein the stopper portion is arranged at plural portions at the radially inner side relative to the thrust members.

7. The torque fluctuation absorber according to claim 1, wherein the stopper portion includes a reduced portion formed at the second rotary member.

8. The torque fluctuation absorber according to claim 7, wherein the second rotary member is arranged at a first axial side and a second axial side of the first rotary member, the reduced portion formed at the second rotary member at the first axial side of the first rotary member and the reduced portion formed at the second rotary member at the second axial side of the first rotary member are connected to each other by a rivet.

9. The torque fluctuation absorber according to claim 7, wherein
the first damper portion includes a plurality of first coil springs arranged at predetermined intervals in a circumferential direction, the plurality of first coil springs absorbing the torsion between the first rotary member and the second rotary member,
the second damper portion is arranged at a radially inner side relative to the first damper portion and includes a plurality of second coil springs arranged at predetermined intervals in the circumferential direction, the plurality of second coil springs absorbing the torsion between the second rotary member and the third rotary member, and
the stopper portion is separately arranged at plural portions at predetermined intervals on a circumference where the first damper portion is provided, the stopper portion being circumferentially displaced relative to the first coil springs of the first damper portion.

10. The torque fluctuation absorber according to claim 9, further comprising a first hysteresis portion absorbing the torque fluctuations caused by the torsion between the first rotary member and the second rotary member, wherein
the second rotary member is arranged at a first axial side and a second axial side of the first rotary member,
the first hysteresis portion is arranged at plural portions at predetermined intervals on the circumference where the first damper portion is provided, the first hysteresis portion including a plurality of thrust members arranged to be circumferentially displaced relative to the first coil springs of the first damper portion, the plurality of thrust members being provided between the first rotary member and the second rotary member and engaging with the second rotary member in a non-rotatable manner, the plurality of thrust members being biased to the first rotary member by a spring action of the second rotary member,
the first rotary member is slidably held by the plurality of thrust members, and
the stopper portion is arranged at a radially inner side relative to the thrust members.

11. The torque fluctuation absorber according to claim 10, wherein the stopper portion is arranged at plural portions at the radially inner side relative to the thrust members.

12. The torque fluctuation absorber according to claim 1, wherein
the first damper portion includes a plurality of first coil springs arranged at predetermined intervals in a circumferential direction, the plurality of first coil springs absorbing the torsion between the first rotary member and the second rotary member,
the second damper portion is arranged at a radially inner side relative to the first damper portion and includes a plurality of second coil springs arranged at predetermined intervals in the circumferential direction, the plurality of second coil springs absorbing the torsion between the second rotary member and the third rotary member, and
the stopper portion is separately arranged at plural portions at predetermined intervals on a circumference where the first damper portion is provided, the stopper portion being circumferentially displaced relative to the first coil springs of the first damper portion.

13. The torque fluctuation absorber according to claim 12, further comprising a first hysteresis portion absorbing the torque fluctuations caused by the torsion between the first rotary member and the second rotary member, wherein the second rotary member is arranged at a first axial side and a second axial side of the first rotary member, the first hysteresis portion is arranged at plural portions at predetermined intervals on the circumference where the first damper portion is provided, the first hysteresis portion including a plurality of thrust members arranged to be circumferentially displaced relative to the first coil springs of the first damper portion, the plurality of thrust members being provided between the first rotary member and the second rotary member and engaging with the second rotary member in a non-rotatable manner, the plurality of thrust members being biased to the first rotary member by a spring action of the second rotary member, the first rotary member is slidably held by the plurality of thrust members, and the stopper portion is arranged at a radially inner side relative to the thrust members.

14. The torque fluctuation absorber according to claim 13, wherein the stopper portion is arranged at plural portions at the radially inner side relative to the thrust members.

* * * * *